US008860771B2

(12) United States Patent
Murphy

(10) Patent No.: US 8,860,771 B2
(45) Date of Patent: *Oct. 14, 2014

(54) METHOD AND SYSTEM FOR MAKING VIDEO CALLS

(75) Inventor: William A. Murphy, Glace Bay (CA)

(73) Assignee: IWatchLife, Inc., Ottawa, Ontario (CA)

( * ) Notice: Subject to any disclaimer, the term of this patent is extended or adjusted under 35 U.S.C. 154(b) by 362 days.

This patent is subject to a terminal disclaimer.

(21) Appl. No.: 13/198,128

(22) Filed: Aug. 4, 2011

(65) Prior Publication Data

US 2012/0033026 A1    Feb. 9, 2012

Related U.S. Application Data

(60) Provisional application No. 61/370,504, filed on Aug. 4, 2010.

(51) Int. Cl.
H04N 7/14    (2006.01)

(52) U.S. Cl.
USPC ........................................ 348/14.01; 725/106

(58) Field of Classification Search
USPC ............................................ 348/14.01–14.09
See application file for complete search history.

(56) References Cited

U.S. PATENT DOCUMENTS

| | | | |
|---|---|---|---|
| 6,166,729 A | 12/2000 | Acosta et al. | |
| 6,195,117 B1 | 2/2001 | Miyazaki et al. | |
| 6,462,785 B1 | 10/2002 | Carraro et al. | |
| 6,831,675 B2 | 12/2004 | Shachar et al. | |
| 6,879,998 B1 | 4/2005 | Raciborski et al. | |
| 7,111,045 B2 | 9/2006 | Kato et al. | |
| 7,382,244 B1 | 6/2008 | Donovan | |
| 7,839,926 B1 | 11/2010 | Metzger et al. | |
| 7,881,505 B2 | 2/2011 | Schneiderman et al. | |
| 8,041,338 B2 | 10/2011 | Chen et al. | |

(Continued)

FOREIGN PATENT DOCUMENTS

| | | | |
|---|---|---|---|
| JP | 2004120178 A | 4/2004 | |
| JP | 2004180290 A | 6/2004 | |

(Continued)

OTHER PUBLICATIONS

Saptharish, M. et al., "An Information Value Driven Architecture for Urban Video Surveillance in Data and Attention Bandwidth Constrained Environments," Proceedings of the Sixth IEEE International Conference on Advanced Video and Signal Based Surveillance, pp. 122-127, Sep. 2-4, 2009.

Primary Examiner — Maria El-Zoobi
(74) Attorney, Agent, or Firm — The Noblitt Group, PLLC

(57) ABSTRACT

A method comprise associating a first user system with a first user and associating a second user system with a second user. The first user system is in communication with the second user system via a communication network, and the second user system comprising an electronic sensor having a known sensing area. A request transmitted from the first user system via the communication network is received at the second user system. The request is for initiating a communication session between the first user and the second user. When the second user other than provides a response to the request within a predetermined period of time, data is sensed within the known sensing area using the electronic sensor of the second user system. The sensed data is analyzed. When a result of the analyzing is indicative of the second user being available, a notification signal is transmitted from the second user system to the first user system, via the communication network.

20 Claims, 8 Drawing Sheets

(56) References Cited

U.S. PATENT DOCUMENTS

| | | |
|---|---|---|
| 8,139,817 B2 | 3/2012 | Laganiere |
| 8,185,959 B2 | 5/2012 | Bellwood et al. |
| 8,290,999 B2 | 10/2012 | Shepherd et al. |
| 8,326,327 B2 | 12/2012 | Hymel et al. |
| 8,335,763 B2 | 12/2012 | Narayanan et al. |
| 8,396,246 B2 | 3/2013 | Anbalagan et al. |
| 8,433,136 B2 | 4/2013 | Epshtein et al. |
| 8,473,420 B2 | 6/2013 | Bohus |
| 2003/0025599 A1 | 2/2003 | Monroe |
| 2003/0070177 A1* | 4/2003 | Kondo et al. ............... 725/106 |
| 2003/0107648 A1 | 6/2003 | Stewart et al. |
| 2003/0167176 A1 | 9/2003 | Knudson et al. |
| 2003/0204856 A1 | 10/2003 | Buxton |
| 2004/0240546 A1 | 12/2004 | Wells |
| 2005/0169546 A1 | 8/2005 | Shin |
| 2005/0195823 A1 | 9/2005 | Chen et al. |
| 2005/0271250 A1 | 12/2005 | Vallone et al. |
| 2006/0053459 A1 | 3/2006 | Simerly et al. |
| 2006/0192698 A1 | 8/2006 | Morel |
| 2006/0195569 A1 | 8/2006 | Barker |
| 2006/0239645 A1 | 10/2006 | Curtner et al. |
| 2006/0271658 A1 | 11/2006 | Beliles |
| 2007/0013776 A1 | 1/2007 | Venetianer |
| 2007/0035632 A1 | 2/2007 | Silvernail et al. |
| 2007/0082700 A1 | 4/2007 | Landschaft et al. |
| 2007/0172155 A1 | 7/2007 | Guckenberger |
| 2007/0217765 A1 | 9/2007 | Itoh et al. |
| 2008/0108339 A1 | 5/2008 | Shaffer et al. |
| 2008/0129844 A1 | 6/2008 | Cusack et al. |
| 2008/0136908 A1 | 6/2008 | Carter |
| 2008/0166966 A1 | 7/2008 | Hamasaki et al. |
| 2008/0184245 A1 | 7/2008 | St-Jean |
| 2008/0235592 A1 | 9/2008 | Trauth |
| 2008/0243614 A1 | 10/2008 | Tu et al. |
| 2008/0258880 A1 | 10/2008 | Smith et al. |
| 2008/0270490 A1 | 10/2008 | Watterott et al. |
| 2008/0279481 A1 | 11/2008 | Ando |
| 2008/0304565 A1 | 12/2008 | Sakhardande et al. |
| 2009/0015671 A1 | 1/2009 | Addy |
| 2009/0021583 A1 | 1/2009 | Salgar et al. |
| 2009/0031381 A1 | 1/2009 | Cohen et al. |
| 2009/0122150 A1* | 5/2009 | Shabtay et al. ............ 348/222.1 |
| 2009/0141939 A1 | 6/2009 | Chambers |
| 2009/0141993 A1 | 6/2009 | Ma et al. |
| 2009/0174763 A1 | 7/2009 | Bengtsson |
| 2009/0189981 A1 | 7/2009 | Siann et al. |
| 2009/0213245 A1 | 8/2009 | Harper et al. |
| 2009/0217343 A1 | 8/2009 | Bellwood |
| 2009/0219387 A1 | 9/2009 | Marman |
| 2009/0219411 A1 | 9/2009 | Marman et al. |
| 2009/0225164 A1 | 9/2009 | Renkis |
| 2009/0238542 A1 | 9/2009 | Adiletta et al. |
| 2009/0245573 A1 | 10/2009 | Saptharishi et al. |
| 2009/0324137 A1 | 12/2009 | Stallings et al. |
| 2010/0097471 A1 | 4/2010 | Drive et al. |
| 2010/0158315 A1 | 6/2010 | Martin |
| 2010/0177938 A1 | 7/2010 | Martinez et al. |
| 2010/0191827 A1 | 7/2010 | Martin |
| 2010/0231714 A1 | 9/2010 | Flores et al. |
| 2011/0022529 A1 | 1/2011 | Barsoba et al. |
| 2011/0092248 A1 | 4/2011 | Evanitsky |
| 2011/0109742 A1 | 5/2011 | Laganiere |
| 2011/0112899 A1 | 5/2011 | Strutton et al. |
| 2011/0113461 A1 | 5/2011 | Laganiere |
| 2011/0273563 A1 | 11/2011 | Murphy |
| 2011/0314159 A1 | 12/2011 | Murphy |
| 2012/0015668 A1 | 1/2012 | Mgrdechian et al. |
| 2012/0033026 A1 | 2/2012 | Murphy |
| 2012/0033027 A1 | 2/2012 | Murphy |
| 2012/0033028 A1 | 2/2012 | Murphy |
| 2012/0033031 A1 | 2/2012 | Murphy |
| 2012/0036262 A1 | 2/2012 | Murphy |
| 2012/0098918 A1 | 4/2012 | Murphy |
| 2012/0129553 A1 | 5/2012 | Phillips et al. |
| 2012/0194676 A1 | 8/2012 | Laganiere |
| 2012/0195363 A1 | 8/2012 | Laganiere |
| 2012/0207349 A1 | 8/2012 | Murphy |
| 2012/0207356 A1 | 8/2012 | Murphy |
| 2014/0036073 A1 | 2/2014 | Black |
| 2014/0036090 A1 | 2/2014 | Black |

FOREIGN PATENT DOCUMENTS

| | | |
|---|---|---|
| JP | 2006279464 A | 10/2006 |
| WO | WO 2005/004062 A2 | 1/2005 |
| WO | WO 2006/012384 A2 | 2/2006 |
| WO | WO 2008/092255 A1 | 8/2008 |
| WO | WO 2008/154003 A2 | 12/2008 |
| WO | WO 2009/111377 A1 | 9/2009 |

* cited by examiner

METHOD AND SYSTEM FOR MAKING VIDEO CALLS

This application claims the benefit of U.S. Provisional Patent Application No. 61/370,504, filed on Aug. 4, 2010, the entire contents of which are incorporated herein by reference.

FIELD OF THE INVENTION

The instant invention relates generally to electronic communication methods and systems, and more particularly to a method and system for initiating video calls.

BACKGROUND OF THE INVENTION

Telecommunication technologies allow two or more parties to communicate almost instantly, even over vast distances. In the early part of the last century, landline telephones became essentially ubiquitous in developed countries. More recently, cellular wireless telephone networks have emerged, allowing parties to communicate with one another from virtually anywhere within a cellular network coverage area.

Videoconferencing has also emerged recently as a viable alternative to voice-only communication. A videoconference is a set of interactive telecommunication technologies, which allow two or more parties to interact via two-way video and audio transmissions simultaneously. Webcams are popular, relatively low cost devices that can provide live video streams via personal computers, and can be used with many software clients for videoconferencing over the Internet.

Voice over Internet Protocol (VoIP) software clients, such as for instance Skype®, support voice-only and/or videoconferencing communication between two or more parties. During use, the VoIP application is in execution on a computer or on another suitable device that is associated with a first party. The VoIP application, and other similar applications, typically provides a list of user names associated with other parties, including an indication of the current status of each of the other parties. Accordingly, a first user can determine when another user is online for a Skype to Skype (VoIP) chat or call, unless the other user wishes to remain hidden. When a second party appears to be available, the first party may attempt to initiate a communication session with the second party. For instance, the first party selects a user name associated with the second party from the list, and then selects an option for initiating a "call" to the second user. The VoIP application that is in execution on a computer or on another suitable device associated with the second party causes an alert to be issued, such as for instance playing a "ringing" sound via a speaker of the computer or other suitable device. In response to the alert, the second party answers the "call" originating from the first party.

Unfortunately, the indicated status of the second party often does not reflect the actual status of the second party. For instance, the second party may fail to change the status indicator from "online" to "away," especially during short or unexpected breaks, etc. Similarly, the second party may fail to change the status indicator from "online" to "do not disturb" at the start of an important meeting. Accordingly, it is often the case that the current status indicator for the second party does not represent the true status of the second party. It is a disadvantage of the prior art that the first party may attempt to contact the second party either at a time when the second party is not present, or at a time when the second party does not wish to be disturbed.

It would be advantageous to provide a method and system for making video calls that overcomes at least some of the above-mentioned limitations of the prior art.

SUMMARY OF EMBODIMENTS OF THE INVENTION

In accordance with an aspect of the invention there is provided a method comprising: associating a first user system with a first user and associating a second user system with a second user, the first user system in communication with the second user system via a communication network, the second user system comprising an electronic sensor; transmitting a first request from the first user system to the second user system, via the communication network, the first request for initiating a communication session between the first user and the second user; when the second user other than provides a response to the first request within a predetermined period of time, activating the electronic sensor of the second user system; using the electronic sensor of the second user system, sensing data within a sensing area of the electronic sensor; performing at least one of video, image and audio analytics to determine when the second user enters the sensing area of the electronic sensor; and, when the second user enters the sensing area of the electronic sensor, performing a predetermined action for initiating the communication session between the first user and the second user.

According to another aspect, the invention provides for a method wherein the electronic sensor is an image capture device having a known field of view (FOV).

According to another aspect, the invention provides for a method wherein the image capture device is a video camera.

According to another aspect, the invention provides for a method wherein the predetermined action comprises transmitting a notification signal from the second user system to the first user system, via the communication network.

According to another aspect, the invention provides for a method wherein the predetermined action comprises initiating automatically the communication session between the first user and the second user.

According to another aspect, the invention provides for a method wherein the predetermined action comprises providing via the second user system an alert for notifying the second user of the request for initiating the communication session between the first user and the second user.

According to another aspect, the invention provides for a method wherein the communication network is an IP network.

According to another aspect, the invention provides for a method wherein the at least one of video, image and audio analytics is performed using at least a process in execution on a processor of the second user system.

According to another aspect, the invention provides for a method wherein the at least one of video, image and audio analytics is performed using at least a process in execution on a processor of the first user system.

According to another aspect, the invention provides for a method wherein the at least one of video, image and audio analytics is performed using at least a process in execution on a processor of at least a third system.

According to another aspect, the invention provides for a method wherein the at least a third system is a network server.

According to another aspect, the invention provides for a method wherein the network server is at least one of a video analytics server, an image analytics server and an audio analytics server.

According to another aspect, the invention provides for a method wherein the at least a third system comprises a plurality of other user systems, and wherein performing the at least one of video analytics, image analytics and audio analytics is accomplished according to a peer-to-peer protocol.

In accordance with an aspect of the invention there is provided a method comprising: associating a first user system with a first user and associating a second user system with a second user, the first user system in communication with the second user system via a communication network, the second user system comprising an electronic sensor; transmitting a first request signal from the first user system to the second user system, via the communication network, the first request signal for initiating a communication session between the first user and the second user; waiting a predetermined period of time to receive, via the communication network, a response signal from the second user, the response signal indicative of the second user agreeing to initiate the communication session; absent receiving the response signal, receiving at the first user system via the communication network sensed data from the electronic sensor of the second user system, the sensed data being sensed subsequent to waiting the predetermined period of time; analyzing the sensed data; and, when a result of the analyzing is indicative of the second user being available, transmitting a second request from the first user system to the second user system, via the communication network, the second request for initiating the communication session between the first user and the second user.

According to another aspect, the invention provides for a method wherein the electronic sensor is an image capture device having a known field of view (FOV).

According to another aspect, the invention provides for a method wherein the image capture device is a video camera.

According to another aspect, the invention provides for a method wherein the sensed data comprises single frames of image data.

According to another aspect, the invention provides for a method wherein the sensed data comprises video data.

According to another aspect, the invention provides for a method wherein analyzing performing video analytics of the video data.

According to another aspect, the invention provides for a method wherein analyzing comprises performing statistical analysis of predetermined individual frames of the video data.

According to another aspect, the invention provides for a method wherein the communication network is an IP network.

In accordance with an aspect of the invention there is provided a method comprising: associating a first user system with a first user and associating a second user system with a second user, the first user system in communication with the second user system via a communication network, the second user system comprising an electronic sensor having a known sensing area; receiving at the second user system a request transmitted from the first user system via the communication network, the request for initiating a communication session between the first user and the second user; when the second user other than provides a response to the request within a predetermined period of time, sensing data within the known sensing area using the electronic sensor of the second user system; analyzing the sensed data; and, when a result of the analyzing is indicative of the second user being available, transmitting a notification signal from the second user system to the first user system, via the communication network.

According to another aspect, the invention provides for a method wherein the electronic sensor is an image capture device having a known field of view (FOV).

According to another aspect, the invention provides for a method wherein the image capture device is a video camera.

According to another aspect, the invention provides for a method wherein the sensed data comprises single frames of image data.

According to another aspect, the invention provides for a method wherein the sensed data comprises video data.

According to another aspect, the invention provides for a method wherein analyzing comprises performing video analytics of the video data.

According to another aspect, the invention provides for a method wherein analyzing comprises performing statistical analysis of predetermined frames of the video data.

According to another aspect, the invention provides for a method wherein the communication network is an IP network.

According to another aspect, the invention provides for a method wherein analyzing comprises performing at least one of video, image and audio analytics of the sensed data.

According to another aspect, the invention provides for a method wherein the at least one of video, image and audio analytics is performed using at least a process in execution on a processor of the second user system.

According to another aspect, the invention provides for a method wherein the at least one of video, image and audio analytics is performed using at least a process in execution on a processor of the first user system.

According to another aspect, the invention provides for a method wherein the at least one of video, image and audio analytics is performed using at least a process in execution on a processor of at least a third system.

According to another aspect, the invention provides for a method wherein the at least a third system is a network server.

According to another aspect, the invention provides for a method wherein the network server is at least one of a video analytics server, an image analytics server and an audio analytics server.

According to another aspect, the invention provides for a method wherein the at least a third system comprises a plurality of other user systems, and wherein performing the at least one of video analytics, image analytics and audio analytics is accomplished according to a peer-to-peer protocol.

In accordance with an aspect of the invention there is provided a method comprising: associating a first user system with a first user and associating a second user system with a second user, the first user system in communication with the second user system via a communication network, the second user system comprising an electronic sensor having a known sensing area; receiving at the second user system a request transmitted from the first user system via the communication network, the request for initiating a communication session between the first user and the second user; when the second user other than provides a response to the request within a predetermined period of time, sensing data using the electronic sensor of the second user system; analyzing the sensed data; and, when a result of the analyzing is indicative of the second user being available, initiating automatically the communication session between the first user and the second user.

According to another aspect, the invention provides for a method wherein the electronic sensor is an image capture device having a known field of view (FOV).

According to another aspect, the invention provides for a method wherein the image capture device is a video camera.

According to another aspect, the invention provides for a method wherein the sensed data comprises single frames of image data.

According to another aspect, the invention provides for a method wherein the sensed data comprises video data.

According to another aspect, the invention provides for a method wherein analyzing comprises performing video analytics on the video data.

According to another aspect, the invention provides for a method wherein analyzing comprises performing statistical analysis of predetermined frames of the video data.

According to another aspect, the invention provides for a method wherein the communication network is an IP network.

According to another aspect, the invention provides for a method wherein analyzing comprises performing at least one of video, image and audio analytics of the sensed data.

According to another aspect, the invention provides for a method wherein the at least one of video, image and audio analytics is performed using at least a process in execution on a processor of the second user system.

According to another aspect, the invention provides for a method wherein the at least one of video, image and audio analytics is performed using at least a process in execution on a processor of the first user system.

According to another aspect, the invention provides for a method wherein the at least one of video, image and audio analytics is performed using at least a process in execution on a processor of at least a third system.

According to another aspect, the invention provides for a method wherein the at least a third system is a network server.

According to another aspect, the invention provides for a method wherein the network server is at least one of a video analytics server, an image analytics server and an audio analytics server.

According to another aspect, the invention provides for a method wherein the at least a third system comprises a plurality of other user systems, and wherein performing the at least one of video analytics, image analytics and audio analytics is accomplished according to a peer-to-peer protocol.

In accordance with an aspect of the invention there is provided a method comprising: associating a first user system with a first user and associating a second user system with a second user, the first user system in communication with the second user system via a communication network, the second user system comprising an electronic sensing device; receiving at the second user system a request transmitted from the first user system via the communication network, the request for initiating a communication session between the first user and the second user; when the second user other than provides a response to the request within a predetermined period of time, sensing data within a sensing area of the sensing device of the second user system; analyzing the sensed data; and, when a result of the analyzing is indicative of the second user being available, performing a predetermined action for initiating the communication session between the first user and the second user.

According to another aspect, the invention provides for a method wherein the predetermined action comprises transmitting a notification signal from the second user system to the first user system, via the communication network.

According to another aspect, the invention provides for a method wherein the predetermined action comprises initiating automatically the communication session between the first user and the second user.

According to another aspect, the invention provides for a method wherein the predetermined action comprises providing via the second user system an alert for notifying the second user of the request for initiating the communication session between the first user and the second user.

According to another aspect, the invention provides for a method wherein the communication network is an IP network.

According to another aspect, the invention provides for a method wherein the sensed data is at least one of video data, image data and audio data.

According to another aspect, the invention provides for a method wherein analyzing the sensed data comprises performing at least one of video analytics, image analytics and audio analytics of the sensed data.

According to another aspect, the invention provides for a method wherein analyzing is performed using a process in execution on a processor of the first user system.

According to another aspect, the invention provides for a method wherein analyzing is performed using a process in execution on a processor of the second user system.

According to another aspect, the invention provides for a method wherein analyzing is performed using a process in execution on a processor of a third user system, the third user system in communication with at least the second user system via the communication network.

BRIEF DESCRIPTION OF THE DRAWINGS

Exemplary embodiments of the invention will now be described in conjunction with the following drawings, wherein similar reference numerals denote similar elements throughout the several views, in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1A:
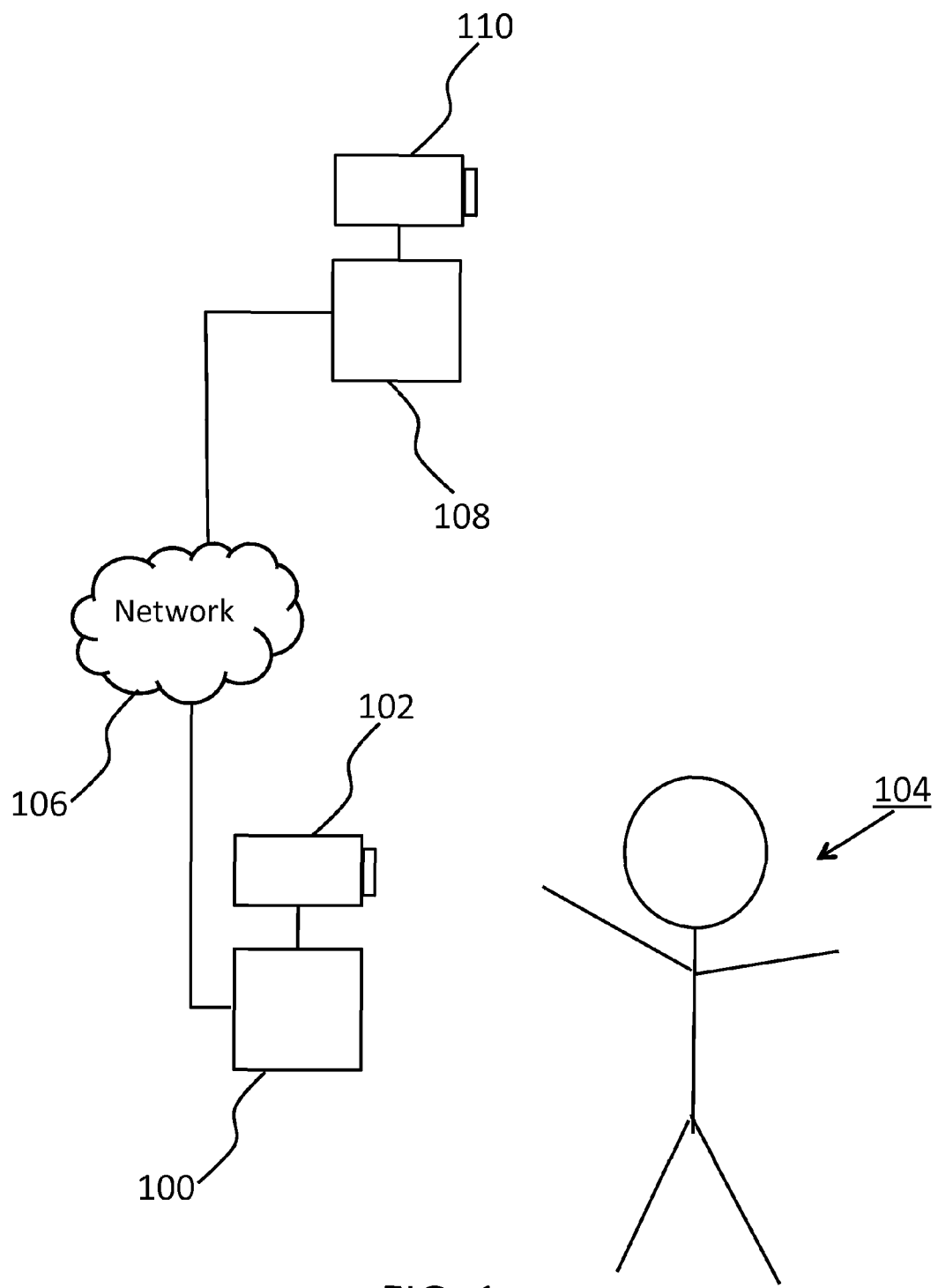
FIG. 1a is a simplified schematic diagram showing a system according to an embodiment of the instant invention, when a second party is absent.
Figure 1B:
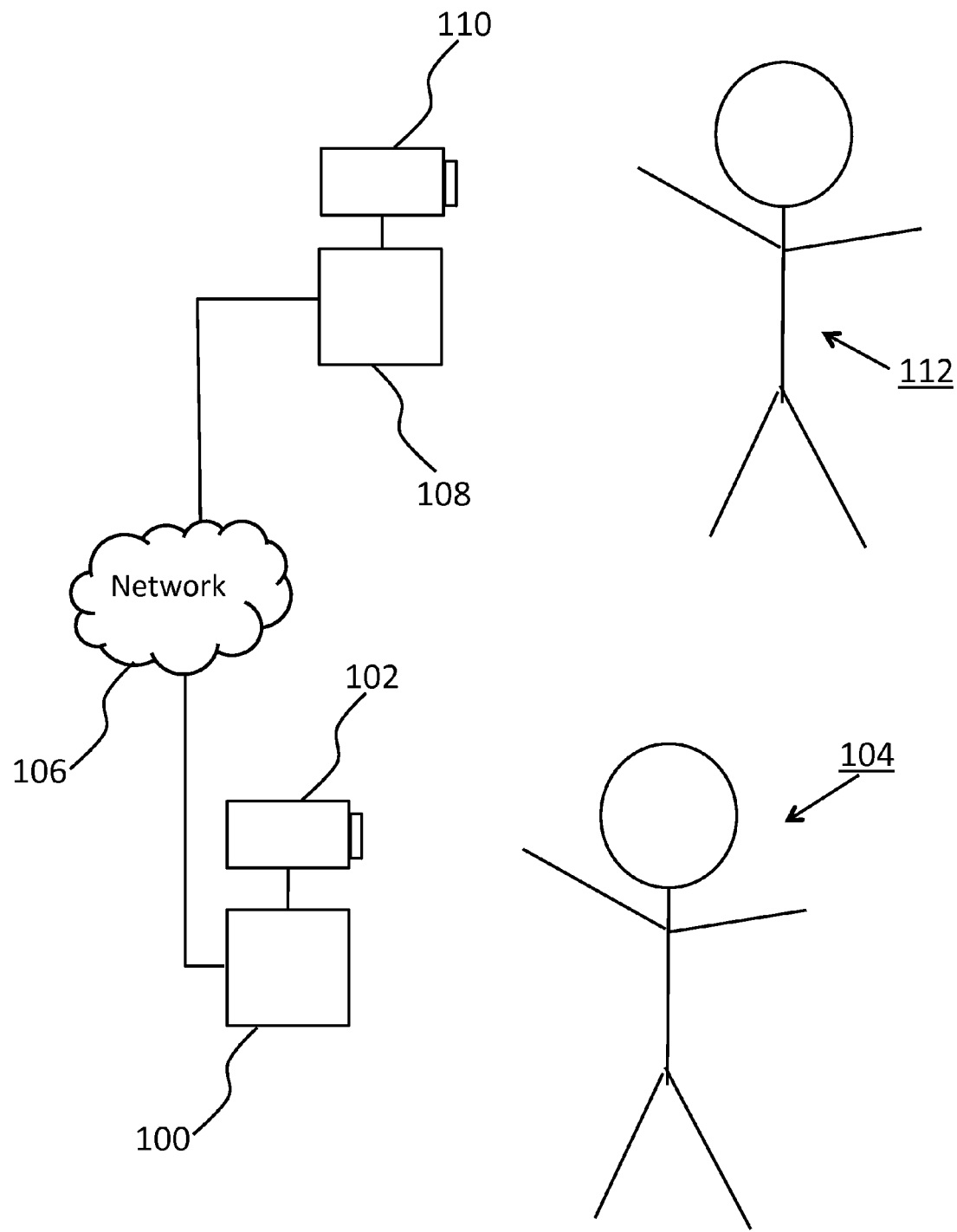
FIG. 1b is a simplified schematic diagram showing the system of FIG. 1a when the second party is present.

FIG. 1a is a schematic diagram showing, during a time when a second user is absent, a system according to an embodiment of the instant invention. FIG. 1b is a schematic diagram showing, during a time when the second user is present, the system of FIG. 1a. Referring now to FIGS. 1a and 1b, a first user system includes a first computer 100 and a first electronic sensor 102, such as for instance a first image capture device. The first user system is associated with a first user 104. The first computer 100 is optionally a mobile computer, such as for instance a laptop computer or tablet type computer, or a cellular telephone (smart phone), or optionally the first computer 100 is a stand-alone camera etc. The first electronic sensor 102 is, for instance, a first image capture device such as a web cam or IP camera that connects to first computer 100 via a USB port or via a wireless communication interface. Optionally, the first electronic sensor 102 comprises an audio capture device. Optionally, the electronic sensor 102 is an edge device that is capable of performing on-board video and/or audio analytics processing.

The first user system is in communication, via network 106, with a second user system, which includes a second computer 108 and a electronic sensor 110, such as for instance a second image capture device. The second user system is associated with a second user 112, as shown in FIG. 1*b*. The second computer 108 is optionally a mobile computer, such as for instance a laptop or tablet type computer, or optionally the second computer 108 is a stand-alone camera. The second electronic sensor 110 is, for instance, a second image capture device such as a web cam or IP camera that connects to second computer 108 via a USB port or via a wireless communication interface. Optionally, the second electronic sensor 110 comprises an audio capture device. Optionally, the second electronic sensor 110 is an edge device that is capable of performing on-board video and/or audio analytics processing. Of course, in order to support bidirectional audio and video communication between the first user 104 and the second user 112, the first user system and the second user system additionally comprise audio and video output devices, such as for instance a display screen and speakers, respectively.

During use, the first user uses a software client in execution on first computer 100 to initiate a communication session between the first user and the second user. For instance, the first user uses the Skype® software application, or another similar Voice over Internet Protocol (VoIP) software client, to select the second user from a list of usernames. A first signal is transmitted from the first system to the second system via communication network 106, the first signal comprising a request to initiate the communication session between the first user and the second user. During a first period of time, as is shown in FIG. 1*a*, the second user 112 is not present at the second user system, and accordingly the second user 112 does not provide a response to the first request. After a predetermined period of time, an application in execution on the second computer 108 activates the second electronic sensor 110. Alternatively, the second electronic sensor is always on, or it is a sensor that begins sensing when motion is detected within a sensing area thereof. The second electronic sensor 110 is then used to sense data within a sensing area thereof, which data are to be analyzed to detect a presence of the second user. When the second electronic sensor 110 is provided in the form of a video capture device, then video data is captured within a field of view (FOV) of the second electronic sensor 110.

The sensed data is analyzed, according to a predetermined scheme, to detect the second user 112 within the sensing area of the second electronic sensor 110. In one implementation, the sensed data is analyzed locally to the second user system using a process in execution on one of a processor of the computer 108 or a processor of the second electronic sensor 110. The processing that is performed locally to the second user system optionally is for detecting at least one of i) motion (relatively simple analytics), ii) the presence of a person (medium relative difficulty analytics), or iii) unique identification of a specific person (highest relative degree of difficulty). Optionally, the processing that is performed locally to the second user system tracks a time property of the sensed data, such as for instance whether i) a specific person is passing by the second user system, or ii) the specific person is seated at the second user system, etc. Further optionally, the sensed data are partially analyzed locally to the second user system, such as for instance to detect motion or to detect a person, and the sensed data are subsequently transmitted to another system, such as for instance the first user system or a third system (such as a video analytics server and/or an audio analytics server) to undergo an analytics process of higher relative difficulty, such as for instance identifying uniquely the second user based on the sensed data. Optionally, the higher relative difficulty analytics comprises determining facial characteristics of the sensed person, and/or comparing the sensed data to a database of known faces, etc.

In a second implementation the sensed data are transmitted initially, via communication network 106, from the second user system to the first user system for analysis using at least a process in execution on a processor thereof. In a third implementation, the sensed data are transmitted initially, via communication network 106, from the second user system to a third system, such as for instance a remote server or server farm. For example, the third system is a video analytics server and/or an audio analytics server. By way of a specific and non-limiting example, the second electronic sensor 110 is a second image capture device and the analysis of the sensed data comprises performing video analytics to determine when the second user enters the FOV of the second image capture device 110. Optionally, the analysis of captured image data comprises performing image analysis of individual frames of image data to determine when the second user enters the FOV of the second image capture device 110. Further optionally, an audio capture device is provided in addition to, or in place of, the second image capture device, in which case analysis is performed on captured audio data to determine when the second user enters the sensing area of the second audio capture device. Optionally, transmitting video data between the second user system and either the first user system or the third system, via communication network 106, comprises streaming the video data, or alternatively it comprises "trickling" individual non-adjacent frames of video data as is described in U.S. Provisional Patent Application 61/249,384 entitled "Video Analytics Method and System," the entire contents of which are incorporated herein by reference. Optionally, video analytics and/or audio analytics processing is distributed to a plurality of other user systems, such as for instance user systems of a plurality of other Skype® users in a peer-to-peer approach.

In the example in which the analysis of the captured image data is performed using processing capabilities of the first user system, then when it is determined that the second user has entered the sensing area of the second electronic sensor 110, the Skype® software application in execution on the first computer 100 transmits a second signal from the first system to the second system via communication network 106. For instance, the second signal comprises a request to initiate the communication session between the first user and the second user.

In the example in which the analysis of the captured image data is performed using processing capabilities local to the second user system, then when it is determined that the second user has entered the sensing area of the second electronic sensor 110, a predetermined action is performed for initiating the communication session between the first user and the second user. For instance, the predetermined action comprises notifying the first user's computer 100 to place a call to the second user, or announcing to the second user that the first user wishes communicate, or notifying the second user to manually take an action, such as for instance calling the first user.

According to an aspect of an embodiment of the instant invention, the predetermined action comprises transmitting a notification signal from the second user system to the first user system, via the communication network 106. The notification signal is received at the first user system and an alert is generated for notifying the first user that the second user is present at the second user system. The first user subsequently uses the Skype® software application that is in execution on the first computer 100 to transmit a second signal from the first system to the second system via communication network 106, the second signal comprising a request to initiate the communication session between the first user and the second user.

According to another aspect of an embodiment of the instant invention, the predetermined action comprises initiating automatically the (voice/video/chat) communication session between the first user and the second user. In particular, the Skype® software application in execution on the second computer 108 provides a second signal in response to the first signal, the second signal for initiating the communication session. Optionally, the second signal comprises a request that is transmitted to the first user system for initiating the communication session between the first user system and the second user system. Optionally, prior to initiating automatically the communication session, video (and/or image and/or audio) analytics is used to determine whether or not a predetermined criterion is met. For instance, video analytics is performed to determine that the second party is at least one of seated in front of the second electronic sensor (such as a video capture device) 110, fully clothed, or alone. Of course, other suitable criteria may also be envisaged.

According to another aspect of an embodiment of the instant invention, the predetermined action comprises providing, via the second user system, an alert for notifying the second user of the request for initiating the communication session between the first user and the second user. Once the second user receives the alert, the second user may attempt to initiate the communication session between the first user and the second user. Optionally, the second user 112 attempts to initiate the communication at a later time, such as for instance a time that is more convenient for the second user 112. Optionally, the second user transmits a signal to the first user, asking if the second user should "watch out" for the first user, or asking the first user to "watch out" for the second user the next time the second user is at the second user system or during a scheduled time period.

Optionally, if the second user 112 is associated with more than one second system, then the first signal is transmitted from the first user system to each of the second systems, via communication network 106. In this case, the first user may establish communication with the second user when the second user is detected at any of the second systems.

Optionally, video/image/audio analytics is performed to detect "a" person within a sensing area of the second electronic sensor 110, after which a prompt is provided requesting the detected person to provide a unique identification (such as speak a user name, password, employee number, etc.) or provide a biometric sample such as a voice sample or high-quality facial image. Unique identification of the detected person as the second user, in this implementation, is based on a combination of the result of relatively less difficult analytics processing and user identification data that is provided by the detected person.

Figure 2:
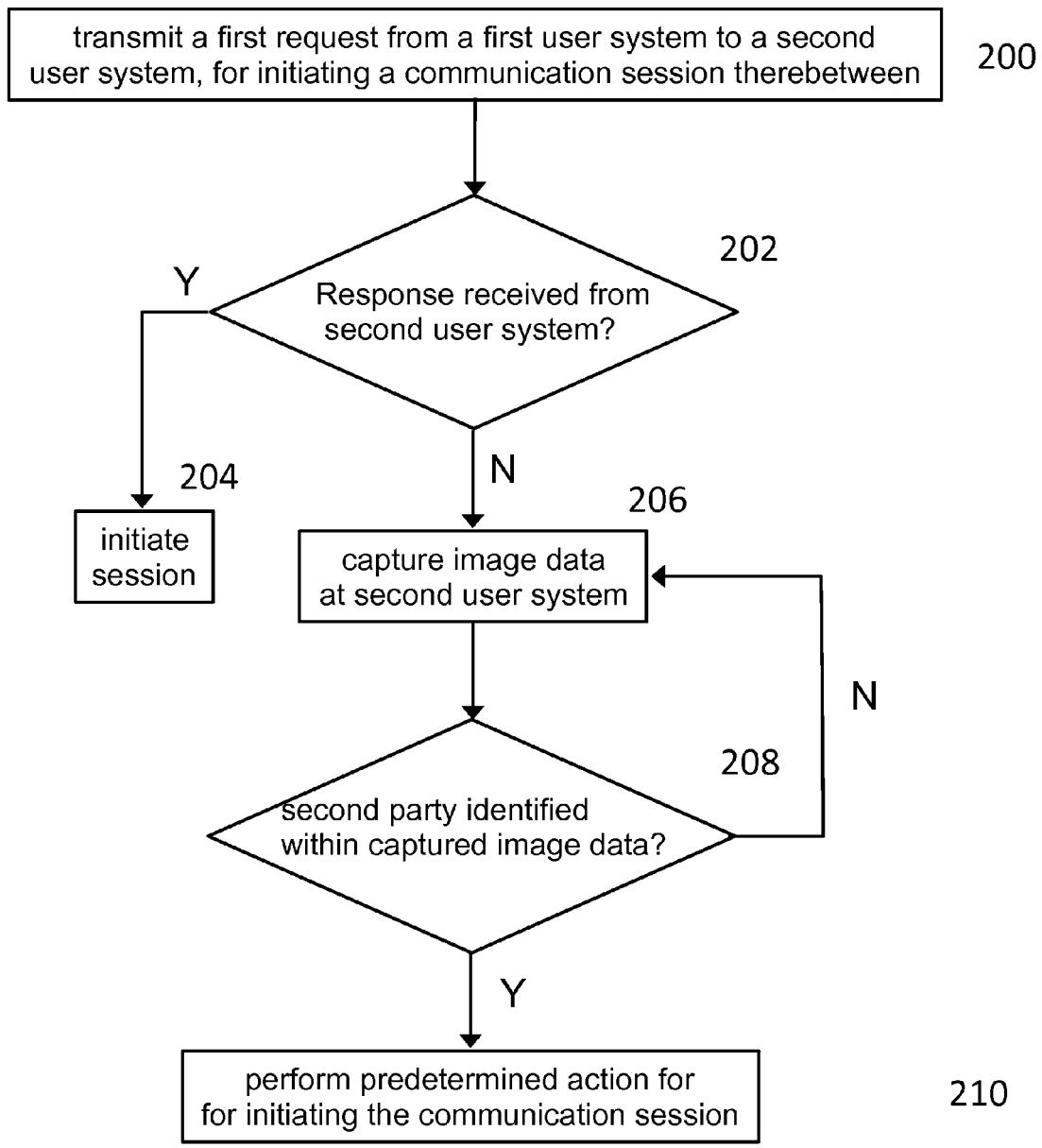
FIG. 2 is a simplified flow diagram of a method according to an embodiment of the instant invention.

Referring now to FIG. 2, shown is a simplified flow diagram of a method according to an embodiment of the instant invention. At 200 a first request signal is transmitted, via a communication network, from a first user system associated with a first user to a second user system associated with a second user. The first request signal is for initiating a communication session between the first user and the second user. At 202 it is determined whether or not a response has been received from the second user system. When it is determined at 202 that a response has been received, then at 204 the communication session between the first user system and the second user system is initiated. When it is determined at 202 that a response has not been received, then at 206 an electronic sensor, such as for instance an image capture device associated with the second user system, is used to sense data within a sensing area of the electronic sensor. For instance, an image capture device is used to capture image data within a field of view (FOV) of the image capture device. Optionally, the image capture device captures video data or single-frame image data. Optionally, the electronic sensor comprises an audio capture device, and audio data is captured within a sensing area of the audio capture device. At 208 it is determined whether or not the second user is identified within the sensed data. For instance, the determination is based on a result of at least one of video, image and audio analytics of the sensed data. Optionally, the at least one of video, image and audio analytics is performed using one or more processes in execution of a system. Alternatively, the analytics is performed using processes in execution on processors of a plurality of different systems. Optionally, the data is subjected to a plurality of stages of analytics of increasing relative difficulty. For instance, first analytics is performed to detect motion, then additional analytics is performed to detect a person, and finally analytics is performed to identify uniquely the second user within the sensing area. When it is determined at 208 that the second user is not identified within the sensed data, then the method returns to 206 and additional data is sensed. When it is determined at 208 that the second user is identified within the sensed data, then at 210 a predetermined action is performed for initiating the communication session.

When the sensed data is transmitted from the second user system to the first user system via the communication network, and the second user is identified within the captured image data using processing capabilities of the first user system, then the predetermined action comprises sending a second request signal for initiating the communication session between the first user and the second user.

When processing capabilities of the second user system are used to identify the second user within the captured image data, then optionally the predetermined action is one of transmitting a notification signal from the second user system to the first user system, initiating automatically the communication session between the first user and the second user, or providing via the second user system an alert for notifying the second user of the request for initiating the communication session.

When processing capabilities of a third system, such as for instance a remote server or server farm, are used to identify the second user within the captured image data, then optionally the predetermined action is one of transmitting a notification signal from the third system to the first user system, initiating automatically the communication session between the first user and the second user, or providing via the second user system an alert for notifying the second user of the request for initiating the communication session.

Optionally, video analytics and/or audio analytics processing is distributed to a plurality of other user systems, such as for instance user systems of a plurality of other Skype® users in a peer-to-peer approach.

As will be understood, performing video analytics may include comparing sensed data with a plurality of template images of the second user. The plurality of template images including images of different views of the second user, with eyes open/closed, looking forward/sideways, different expressions, etc. Audio analytics includes comparing sensed data with a voiceprint of the second user.

Figure 3:
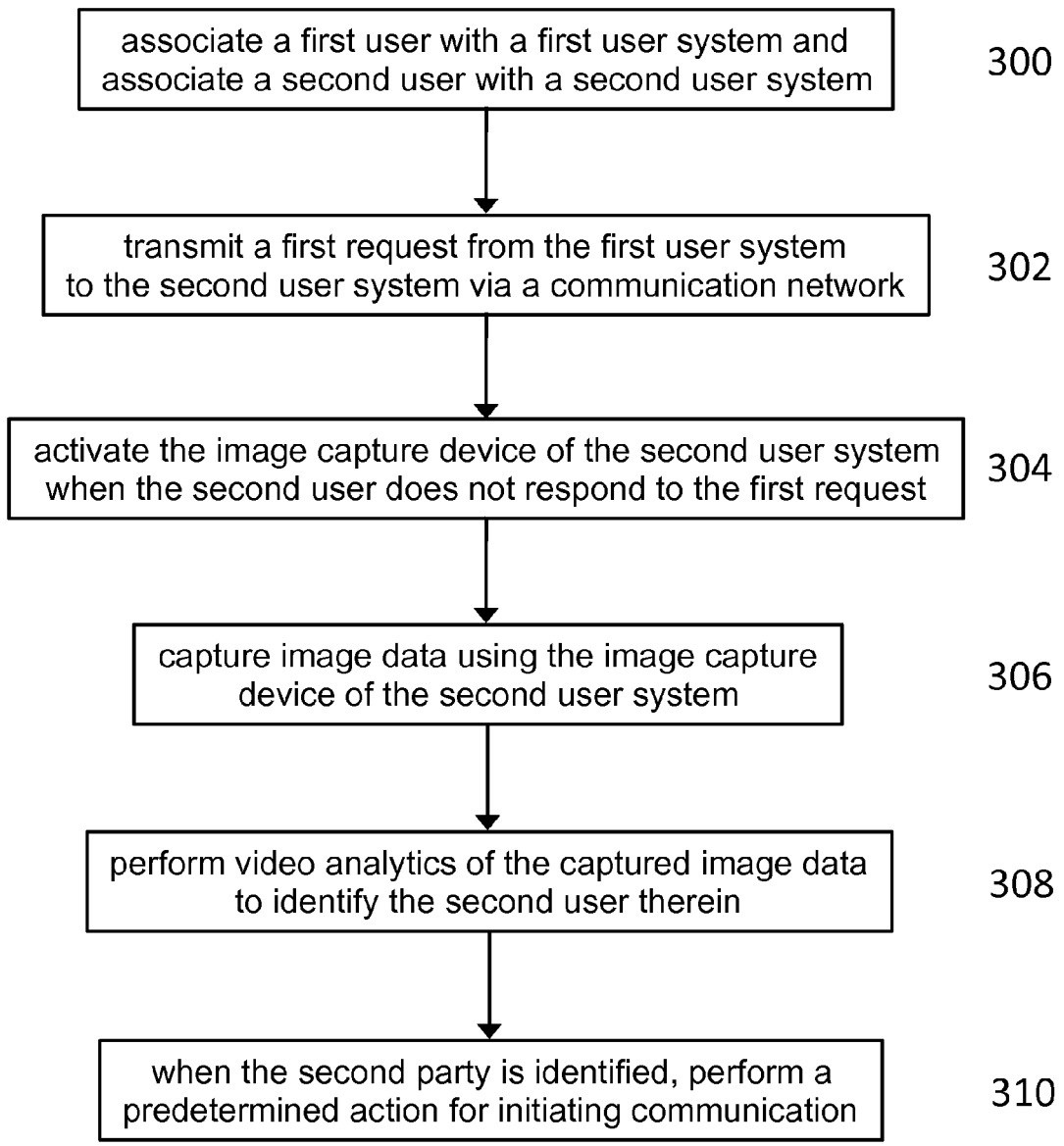
FIG. 3 is a simplified flow diagram of a method according to an embodiment of the instant invention.

Referring now to FIG. 3, shown is a simplified flow diagram of a method according to an embodiment of the instant invention. At 300 a first user is associated with a first user system and a second user is associated with a second user system. In particular, the first user system is in communication with the second user system via a communication network, and at least the second user system comprises an electronic sensor, such as for instance at least one of an image capture device and an audio capture device. At 302 a first request is transmitted from the first user system to the second user system, via the communication network, the first request for initiating a communication session between the first user and the second user. At 304, when the second user other than provides a response to the first request within a predetermined period of time, the electronic sensor of the second user system is activated. Alternatively, the electronic sensor is already active and senses data substantially continuously. At 306 the electronic sensor of the second user system is used to sense data within a sensing area of the electronic sensor. For instance, when the electronic sensor is a video capture device, the video capture device is used to capture video data within a field of view (FOV) of the image capture device. At 308 at least one of video, image and audio analytics is performed to determine when the second user enters the sensing area (e.g., FOV) of the electronic sensor. At 310, when a result of the at least one of video, image and audio analytics is indicative of the second user entering the sensing area (e.g., FOV) of the electronic sensor, a predetermined action is performed for initiating the communication session between the first user and the second user.

Figure 4:
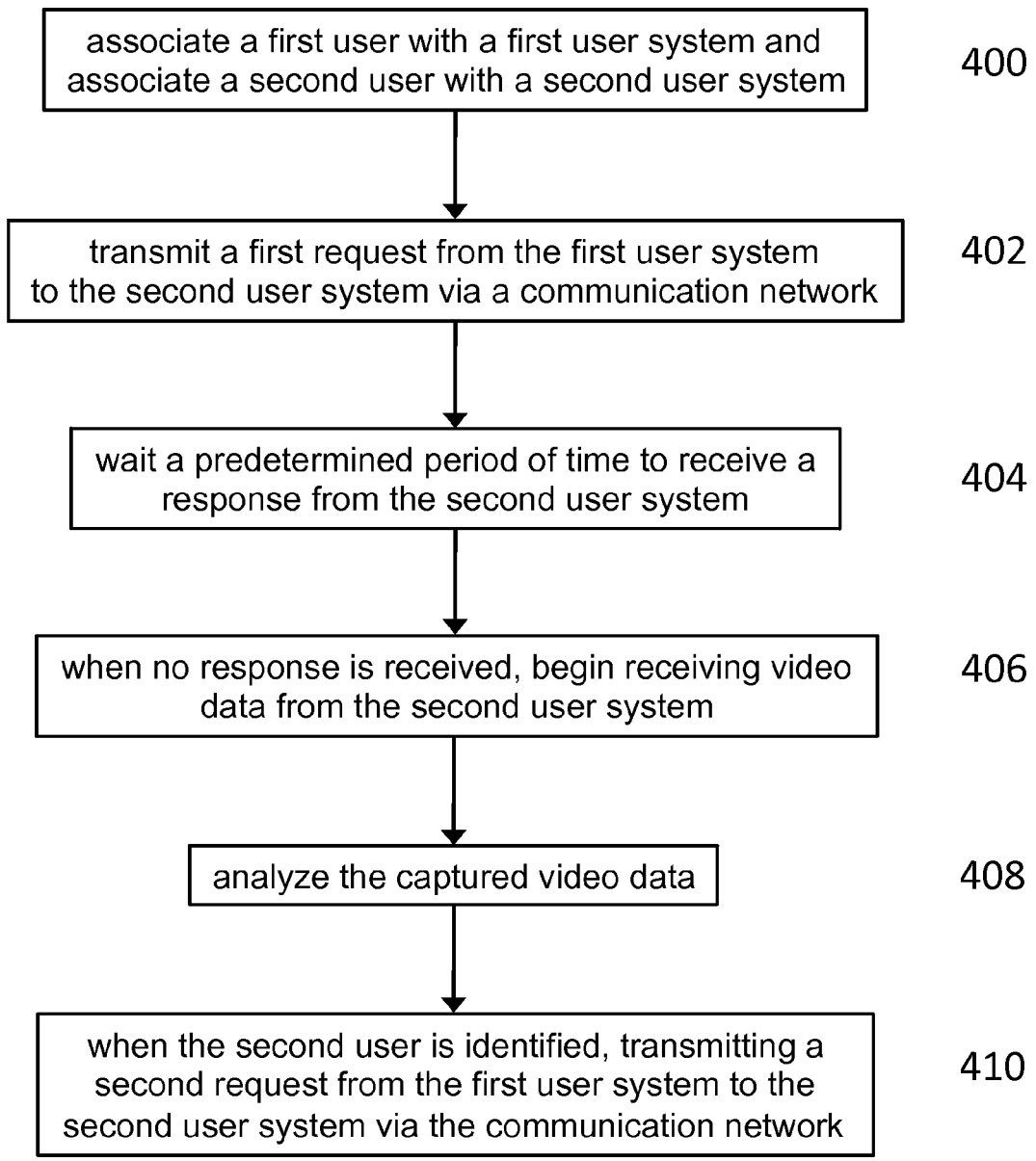
FIG. 4 is a simplified flow diagram of a method according to an embodiment of the instant invention.

Referring now to FIG. 4, shown is a simplified flow diagram of a method according to an embodiment of the instant invention. At 400 a first user is associated with a first user system and a second user is associated with a second user system. In particular, the first user system is in communication with the second user system via a communication network, and at least the second user system comprises an electronic sensor, such as for instance an image capture device. At 402 a first request signal is transmitted from the first user system to the second user system. The first request signal is transmitted via the communication network, and is for initiating a communication session between the first user and the second user. At 404 the first user system provides a predetermined period of time for receiving, via the communication network, a response signal from the second user, the response signal being indicative of the second user agreeing to initiate the communication session. At 406, absent receiving the response signal, the first user system receives sensed data (e.g., at least one of video data, image data and audio data) from the second user system via the communication network. In particular the at least one of video data, image data and audio data is sensed subsequent to the predetermined period of time, using the electronic sensor of the second user system. At 408 the sensed data is analyzed. At 410, when a result of the analyzing is indicative of the second party being available, a second request is transmitted from the first user system to the second user system, via the communication network. In particular, the second request is for initiating the communication session between the first user and the second user.

Figure 5:
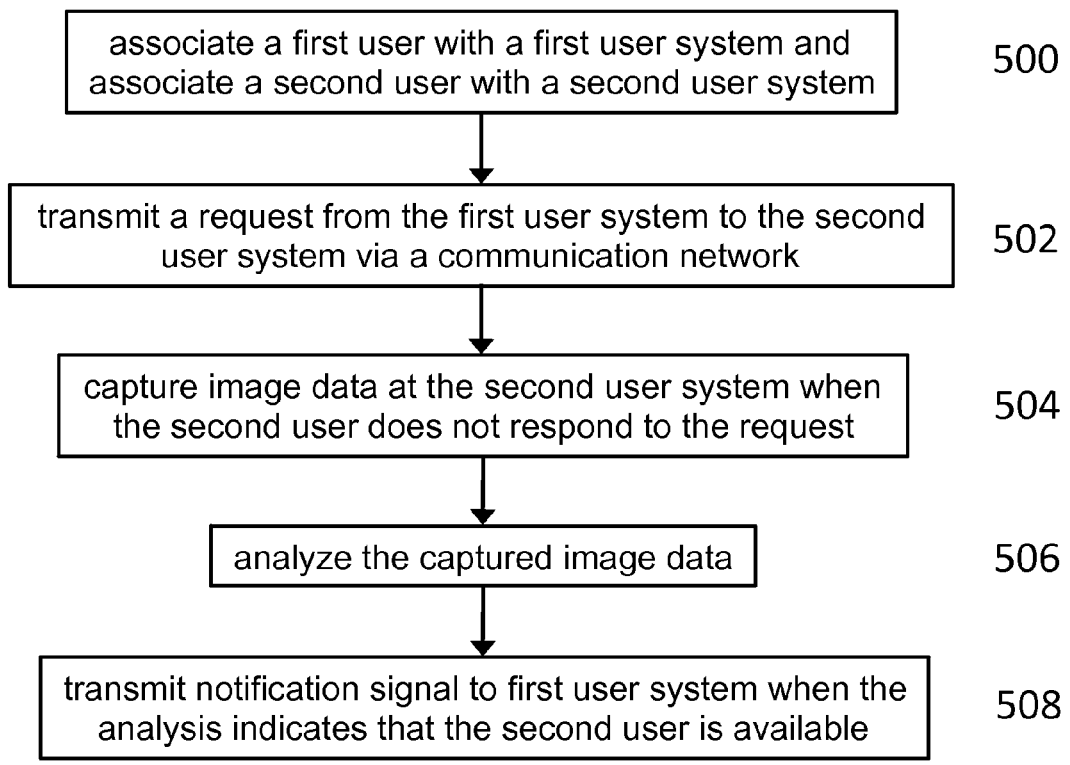
FIG. 5 is a simplified flow diagram of a method according to an embodiment of the instant invention.

Referring now to FIG. 5, shown is a simplified flow diagram of a method according to an embodiment of the instant invention. At 500 a first user is associated with a first user system and a second user is associated with a second user system. In particular, the first user system is in communication with the second user system via a communication network, and at least the second user system comprises an electronic sensor, such as for instance an image capture device. At 502 a request transmitted from the first user system via the communication network is received at the second user system. The request is for initiating a communication session between the first user and the second user. At 504, when the second user other than provides a response to the request within a predetermined period of time, at least one of video data, image data and audio data is sensed using the electronic sensor of the second user system. At 506 the sensed data is analyzed. At 508, when a result of the analyzing is indicative of the second user being available, a notification signal is transmitted from the second user system to the first user system, via the communication network.

Figure 6:
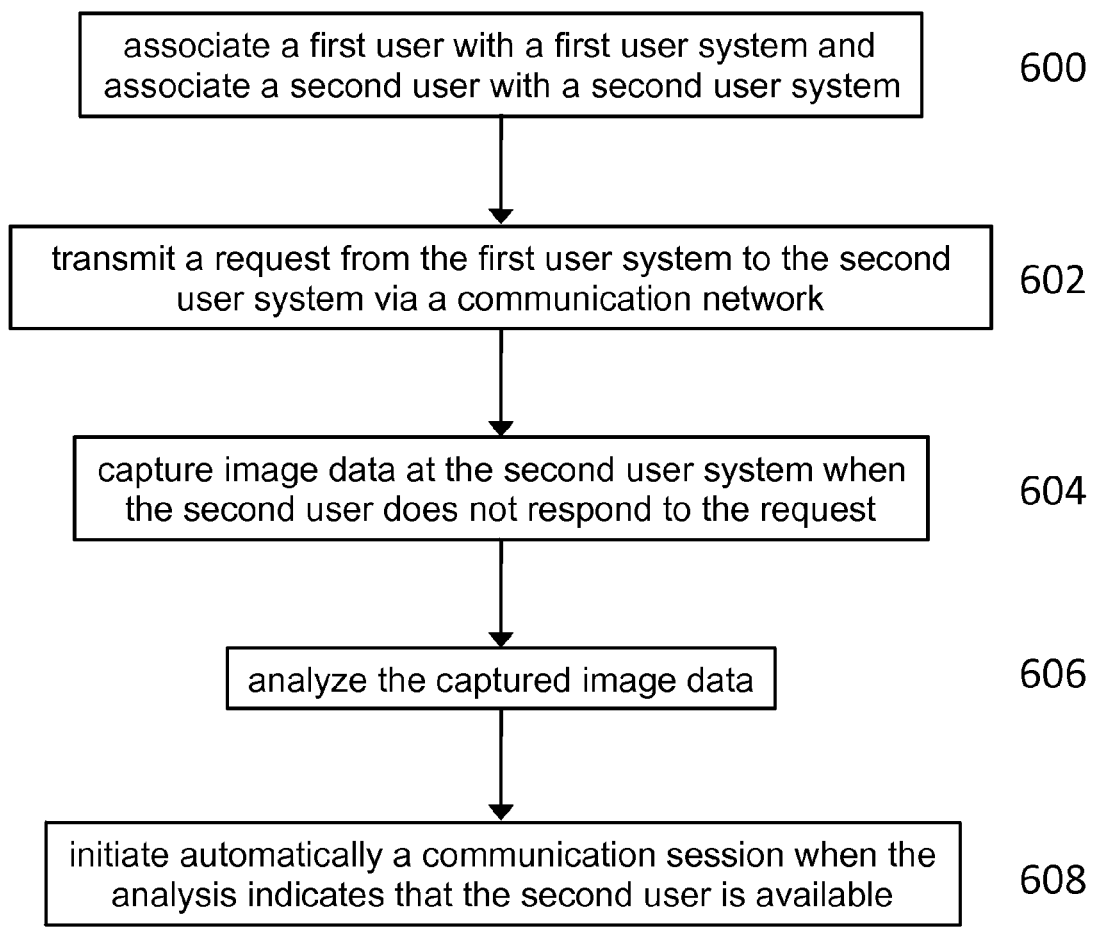
FIG. 6 is a simplified flow diagram of a method according to an embodiment of the instant invention; and, FIG. 7 is a simplified flow diagram of a method according to an embodiment of the instant invention.

Referring now to FIG. 6, shown is a simplified flow diagram of a method according to an embodiment of the instant invention. At 600 a first user is associated with a first user system and a second user is associated with a second user system. In particular, the first user system is in communication with the second user system via a communication network, and at least the second user system comprises an electronic sensor, such as for instance an image capture device. At 602 a request transmitted from the first user system, via the communication network, is received at the second user system, the request for initiating a communication session between the first user and the second user. At 604 when the second user other than provides a response to the request within a predetermined period of time, at least one of video data, image data and audio data is captured using the electronic sensor of the second user system. At 606 the sensed data is analyzed. At 608, when a result of the analyzing is indicative of the second user being available, the communication session between the first user and the second user is initiated automatically.

Figure 7:
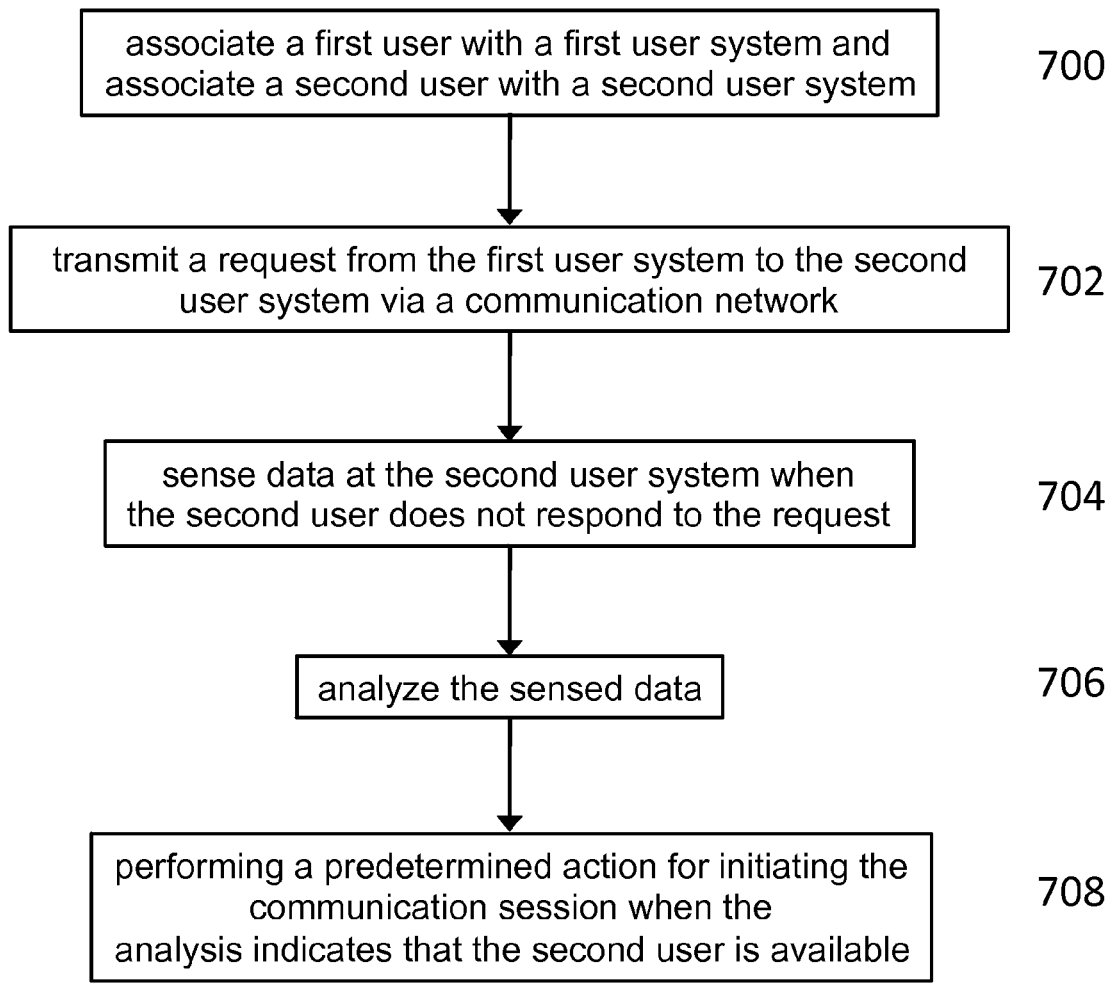

Referring now to FIG. 7, shown is a simplified flow diagram of a method according to an embodiment of the instant invention. At 700 a first user is associated with a first user system and a second user is associated with a second user system. In particular, the first user system is in communication with the second user system via a communication network, and at least the second user system comprises an electronic sensing device. At 702 a request transmitted from the first user system, via the communication network, is received at the second user system, the request for initiating a communication session between the first user and the second user. At 704 when the second user other than provides a response to the request within a predetermined period of time, data is sensed within a sensing area of the sensing device of the second user system. At 706 the sensed data is analyzed. At 708, when a result of the analyzing is indicative of the second user being available, performing a predetermined action for initiating the communication session between the first user and the second user.

Optionally, the image (or video) capture devices that are used with the above-described systems and methods are designed to operate in one or more of the visible and infra-red regions of the electromagnetic spectrum.

Numerous other embodiments may be envisaged without departing from the scope of the invention.

What is claimed is:

1. A method comprising:
    associating a first user system with a first user;
    providing a second user system for use by a second user, the first user system in communication with the second system via a communication network, the second system comprising an electronic sensor;
    transmitting a first request from the first user system to the second system, via the communication network, the first request for initiating a communication session between the first user and the second user;
    when the second user does not provide a response to the first request within a predetermined period of time, activating by an application in execution on the second system the electronic sensor of the second system;
    using the electronic sensor of the second system, capturing at least one of video data, image data and audio data from within a sensing area of the electronic sensor;
    performing at least one of video, image and audio analytics on the captured at least one of video data, image data and audio data to determine when the second user enters the sensing area of the electronic sensor, based on comparing one of a template image of the second user and a voiceprint of the second user to the at least one of video data, image data and audio data, for uniquely identifying the second user within the sensing area; and,
    in response to determining that the second user enters the sensing area of the electronic sensor, automatically performing a predetermined action for initiating the communication session between the first user and the second user.

2. A method according to claim 1, wherein the electronic sensor is an image capture device having a known field of view (FOV).

3. A method according to claim 1, wherein the predetermined action comprises transmitting a notification signal from the second system to the first user system, via the communication network.

4. A method according to claim 1, wherein the predetermined action comprises initiating automatically the communication session between the first user and the second user.

5. A method according to claim 1, wherein the predetermined action comprises providing via the second system an alert for notifying the second user of the request for initiating the communication session between the first user and the second user.

6. A method according to claim 1, wherein the at least one of video, image and audio analytics is performed using at least a process in execution on a processor of the second system.

7. A method according to claim 1, wherein the at least one of video, image and audio analytics is performed using at least a process in execution on a processor of the first user system.

8. A method comprising:
    associating a first user system with a first user;
    providing a second system for use by a second user, the first user system in communication with the second system via a communication network, the second user system comprising an electronic sensor having a known sensing area;
    receiving at the second system a request transmitted from the first user system via the communication network, the request for initiating a communication session between the first user and the second user;
    when the second user does not provide a response to the request within a predetermined period of time, sensing at least one of video data, image data and audio data within the known sensing area using the electronic sensor of the second system;
    analyzing the sensed data by performing at least one of video, image and audio analytics on the sensed at least one of video data, image data and audio data to determine when the second user enters the sensing area of the electronic sensor, based on comparing one of a template image of the second user and a voiceprint of the second user to the at least one of video data, image data and audio data, for uniquely identifying the second user within the sensing area; and,
    when a result of the analyzing is indicative of the second user being sensed within the known sensing area, transmitting a notification signal from the second system to the first user system, via the communication network, the notification signal comprising an indication that the second user has become available to accept the request for initiating the communication session.

9. A method according to claim 8, wherein the electronic sensor is an image capture device having a known field of view (FOV).

10. A method according to claim 8, wherein the sensed data comprises single frames of image data.

11. A method according to claim 8, wherein the sensed data comprises video data.

12. A method according to claim 11, wherein analyzing comprises performing video analytics of the video data.

13. A method according to claim 11, wherein analyzing comprises performing statistical analysis of predetermined frames of the video data.

14. A method comprising:
    associating a first user system with a first user;
    providing a second system for use by a second user, the first user system in communication with the second system via a communication network, the second system comprising an electronic sensing device;
    receiving at the second system a request transmitted from the first user system via the communication network, the request for initiating a communication session between the first user and the second user;
    when the second user does not provide a response to the request within a predetermined period of time, sensing at least one of video data, image data and audio data within a sensing area of the sensing device of the second system;
    analyzing the sensed data by performing at least one of video, image and audio analytics on the sensed at least one of video data, image data and audio data to determine when the second user enters the sensing area of the electronic sensor, based on comparing one of a template, image of the second user and a voiceprint of the second user to the at least one of video data, image data and audio data, for uniquely identifying the second user within the sensing area; and,
    when a result of the analyzing is indicative of the second user being sensed within the sensing area, performing a predetermined action for initiating the communication session between the first user and the second user.

15. A method according to claim 14, wherein the predetermined action comprises transmitting a notification signal from the second system to the first user system, via the communication network.

16. A method according to claim 14, wherein the predetermined action comprises initiating automatically the communication session between the first user and the second user.

17. A method according to claim 14, wherein the predetermined action comprises providing via the second system an alert for notifying the second user of the request for initiating the communication session between the first user and the second user.

18. A method according to claim 14, wherein the communication network is an IP network.

19. A method according to claim 14, wherein analyzing is performed using a process in execution on a processor of the first user system.

20. A method according to claim 14, wherein analyzing is performed using a process in execution on a processor of the second system.

\* \* \* \* \*